United States Patent Office 3,457,182
Patented July 22, 1969

3,457,182
GLASS COMPOSITIONS FOR LASER APPLICATION
Haynes A. Lee, Jr., Sylvania, and Charles F. Rapp, Toledo, Ohio, assignors to Owens-Illinois, Inc., a corporation of Ohio
No Drawing. Filed Apr. 28, 1966, Ser. No. 545,863
Int. Cl. C09k 1/04
U.S. Cl. 252—301.4         9 Claims The present invention relates to novel glass compositions having certain valuable properties and, more particularly, glass compositions which are used for glass lasers and method of producing same.

The term "laser" is an acronym for "light amplification by stimulated emission of radiation." A laser is a device capable of amplifying or generating coherent light. Lasers generate monochromatic optical radiation in the form of a narrowly plane wave with a beam angle diversion theoretically limited by diffraction effects. When a material exhibits stimulated emission of radiation under a particular set of conditions it is said to "lase."

The configuration of the laser body itself may take various forms. For example, it may be in the form of a small cylinder or rod the end faces of which are plane and which may have an extremely high degree of parallel accuracy. In addition, the end faces may be cut so as to be totally internally reflecting or cut to a Brewster angle to decrease the reflection loss. Various other modifications of the laser body itself can be made with the laser compositions of the present invention. Thus, one end of the rod may be completely reflecting and the other of the end faces may be partially reflecting. It will be apparent that the configuration and characteristics of the laser may vary widely and is not a critical feature of the present invention. In actual operation, the laser body is irradiated by suitable means such as a flash lamp operating for a few milliseconds at a time with an input energy of normally greater than about 100 joules.

In many instances involving actual operation of the laser, most of the input energy is dissipated as heat and only a relatively small portion of the energy emitted by the source of radiation is absorbed by the laser materials. Nevertheless, this is a high concentration of energy and it provides the excitation for the laser. The energy is absorbed by the laser over a broad spectral region and the laser cylinder funnels the energy into a narrow emission line whose wave length is a function of the laseable substance contained in the laser host. Further information concerning lasers will be found in the book entitled, "Lasers—Generation of Light by Stimulated Emission," by Bela A. Lengyel, John Wiley & Sons, New York, 1962.

Most of the laser glasses exhibit poor solarization tendencies due to the oxides of the alkali or divalent metals which they contain. As a result of this solarization, many of the prior known glasses are unsuitable and result in a serious impairment of the efficiency of the laser. Because of their unique properties, lasers may be used for a wide variety of purposes including scientific experimentation, use of light as a carrier for intelligence and use of light concentrations of power for technological and military purposes. To illustrate, in the field of communications it has been estimated that under proper controls an extremely potent information carrier could be achieved and under ideal conditions a single laser could replace all of the information carrying systems between east and west coasts of the United States. In addition, because of extremely narrow beam a laser is suitable for point-to-point communication in space where atmospheric attenuation does not interfere with the propagation of radiation. Other uses for lasers include surgical and biological applications, control over chemical reactions and various other purposes. Recently, lasers have achieved wide attention and it is generally acknowledged that they represent an extremely important and valuable tool for a great many purposes.

Accordingly, it is an object of the present invention to provide novel glass compositions which overcome or diminish some of the disadvantages and drawbacks associated with prior known glass compositions used as laser hosts.

It is a further object of the present invention to provide novel glass compositions which have desirable properties making them extremely valuable as laser hosts.

It is a further object of the present invention to provide novel glass laser compositions which exhibit improved properties and characteristics.

It is a further object of the present invention to provide novel glass lasers which diminish some of the disadvantages and drawbacks of prior glass lasers.

It is a further object of the present invention to provide glass lasers which exhibit very little solarization.

It is a further object of the present invention to provide a method for making laseable compositions which diminish the disadvantages and drawbacks of prior glass laser compositions.

It is a further object of the present invention to provide a method for making glass lasers which display very little solarization.

In attaining the above objects one feature of the present invention resides in novel glass compositions containing a laseable substance and which exhibit improved properties and characteristics.

A further feature of the present invention resides in laseable compositions where the glass host is a selected composition from the silica-alumina-lithia system $$(SiO_2\text{---}Al_2O_3\text{---}Li_2O\text{---})$$

which exhibits very little solarization.

The above as well as other objects, features and advantages of the present invention will become apparent from the following detailed description thereof.

Heretofore, many glass compositions have been used as the host for laseable substances. Although glass of various types is widely known for its many excellent properties and has been extensively used as the host for laseable substances there are nevertheless, certain drawbacks to the use of various glass compositions and many efforts have been made to overcome some or all of these disadvantages. In glass used as host compositions which contain heavy alkali (sodium and potassium) or divalent metal oxides, it has been observed that poor solarization tendencies are present. This has resulted in poor efficiency for the laser and has been the subject of extensive investigations. According to the present invention there are provided selected glass compositions which exhibit only very little solarization and which represent a significant improvement in glass laser host compositions. Lasers of the present invention are extremely valuable and useful particularly where the lasers are subjected to high intensities of energy.

In its broadest aspects the present invention relates to glass compositions selected from the silica-alumina-lithia system containing the following ingredients in percent by weight based on the total composition:

| Component: | Weight percent |
|---|---|
| $SiO_2$ | At least 45 and up to 80. |
| $Al_2O_3$ | Greater than 4 up to 40. |
| $Li_2O$ | Greater than 5.5 up to 20. |

The laseable substance which is dispersed in the glass compositions of the present invention is neodymium oxide ($Nd_2O_3$). The amount of neodymium oxide incorporated into the laser host glass is not narrowly critical but generally will be in the range of about 1 to 4% and even as much as 8% by weight of the total composition. The amount of $Al_2O_3$ that is suitable is from greater than 4 up to as high as about 80 weight percent although the preferred amount is about 4.6 to 36 weight percent. The amount of $Li_2O$ generally suitable is an amount greater than 5.5 up to about 20 weight percent and the preferred amount is about 5.6 to about 18 weight percent.

It will be apparent that various other ingredients in small amounts can be present in the glass compositions of the present invention, thus small amounts of alkali $Na_2O$ or $K_2O$ can be tolerated although the resistance to solarization diminishes; therefore, these should be kept at a minimum, generally under about 1%, and preferably under about ½% by weight.

Oxides such as $ZrO_2$, $TiO_2$ and $Ce_2O_3$ that inhibit solarization can be added to the laser composition provided they are in small amounts and do not otherwise deleteriously affect the desired properties. Generally, when one or more of the above described oxides that help inhibit solarization are used, they are used in amounts of about as low as ½ to 1% by weight up to about 2 or 3% by weight and for a particular combination of properties 5 or more weight percent can be used.

Among the laser compositions of the present invention are those comprising the following ingredients in the indicated weight percent ranges:

| Component: | Weight percent |
| --- | --- |
| $SiO_2$ | 45–80 |
| $Al_2O_3$ | 4.6–36 |
| $Li_2O$ | 5.6–18 |
| $Nd_2O_3$ | 1–4 |

The various raw materials that are used to form the glass compositions of the present invention may be added in various forms such as oxides, carbonates and the like. The melt is prepared by mixing the components together and dispersing the neodymium oxide therein. Minor amounts of other ingredients may also be present in the melt provided their presence does not adversely affect the final composition or the desired end properties. For example, it is important that the iron content be kept very low in neodymium laser glass as FeO has an absorption band that overlaps the lasing wave length at $1.06\mu$. The level of iron in the glasses prepared range from about 25 to 50 p.p.m. $Fe_2O_3$. In general, the tolerable upper limit to this value is probably about 100 p.p.m. $Fe_2O_3$.

The following examples serve to illustrate the present invention but are not considered limiting thereof in any way.

EXAMPLE I

A melt was prepared by mixing reagent grade raw materials to form a melt of high optical quality. The melt had the following composition in parts by weight based on the total composition:

| Component: | Weight percent |
| --- | --- |
| $SiO_2$ | 77.16 |
| $Al_2O_3$ | 4.68 |
| $Li_2O$ | 15.07 |
| $Nd_2O_3$ | 3.09 |

Rods of about ½ inch diameter x 4 inches long were prepared from the melt and the ends of the rods were polished to a close tolerance. When tested the laser showed a significant reduction in the tendency to solarize.

EXAMPLE II

| Component: | Weight percent |
| --- | --- |
| $SiO_2$ | 56.32 |
| $Al_2O_3$ | 35.99 |
| $Li_2O$ | 5.68 |
| $Nd_2O_3$ | 2.00 |

A melt was prepared having the above theoretical composition using reagent grade raw materials. High optical quality was characteristic of the melts prepared in accordance with the present invention. Rods were prepared as explained in Example I and were tested and found to be satisfactory.

EXAMPLE III

| Component: | Weight percent |
| --- | --- |
| $SiO_2$ | 45.39 |
| $Al_2O_3$ | 34.23 |
| $Li_2O$ | 17.55 |
| $Nd_2O_3$ | 2.82 |

Reagent grade raw materials were used to prepare the melt having the theoretical composition set forth above. The melt was formed into samples having dimensions of about 3 inches diameter x ½ inch thick. The samples were tested for solarization which was very slight.

It is to be noted that when a glass laser rod is being pumped by high intensity light source, the glass tends to darken and this darkening or solarization causes a severe drop in the efficiency of the laser. The lasers of the present invention are extremely valuable and useful in this respect because they overcome this problem or at least diminish it to the extent where the drop in efficiency is far less than has been observed in connection with lasers prepared with conventional glass compositions.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A transparent glass laser comprising the following composition:

| Component: | Weight percent |
| --- | --- |
| $SiO_2$ | At least 45 up to 80. |
| $Al_2O_3$ | Greater than 4 up to 40. |
| $Li_2O$ | Greater than 5.5 up to 20. |
| $Nd_2O_3$ | At least about 1 up to 8. |

2. A glass laser as defined in claim 1 wherein the composition comprises the following components in the indicated percent by weight:

| Component: | Weight percent |
| --- | --- |
| $SiO_2$ | 45–80 |
| $Al_2O_3$ | 4.6–36 |
| $Li_2O$ | 5.6–18 |
| $Nd_2O_3$ | 1–4 |

3. A glass laser as defined in claim 1 which exhibits reduced solarization tendency consisting essentially of the following components in the indicated amounts:

| Component: | Weight percent |
| --- | --- |
| $SiO_2$ | 77.16 |
| $Al_2O_3$ | 4.68 |
| $Li_2O$ | 15.07 |
| $Nd_2O_3$ | 3.09 |

4. A glass laser as defined in claim 1 which exhibits reduced solarization tendency consisting essentially of the following components in the indicated amounts:

| Component: | Weight percent |
| --- | --- |
| $SiO_2$ | 56.32 |
| $Al_2O_3$ | 35.99 |
| $Li_2O$ | 5.68 |
| $Nd_2O_3$ | 2.00 |

5. A glass laser as defined in claim 1 which exhibits reduced solarization tendency consisting essentially of the following components:

| Component: | Weight percent |
|---|---|
| $SiO_2$ | 45.39 |
| $Al_2O_3$ | 34.23 |
| $Li_2O$ | 17.55 |
| $Nd_2O_3$ | 2.82 |

6. A glass laser as defined in claim 1 in which solarization inhibiting amounts of an oxide that retards solarization are also present in the final composition.

7. A glass laser as defined in claim 6 in which the oxide that retards solarization is $TiO_2$ and it is used in amounts of about ½ to 5% by weight.

8. A glass laser as defined in claim 6 in which the oxide that retards solarization is $Ce_2O_3$ and it is used in amounts of about ½ to 5% by weight.

9. In a method of making a glass laser, the improvement which comprises reducing the solarization tendency of the glass laser host by forming the glass laser from a composition containing the following ingredients in the indicated weight percent ranges:

| Component: | Weight percent |
|---|---|
| $SiO_2$ | At least 45 up to 80. |
| $Al_2O_3$ | Greater than 4 up to 40. |
| $Li_2O$ | Greater than 5.5 up to 20. |
| $Nd_2O_3$ | At least about 1 up to 8. |

References Cited

UNITED STATES PATENTS

| 3,208,009 | 9/1965 | Etzel et al. | 252—301.4 |
| 3,270,290 | 8/1966 | Maurer. | |
| 3,384,597 | 5/1968 | De Paolis. | |

FOREIGN PATENTS 1,015,057   12/1965   Great Britain.

TOBIAS E. LEVOW, Primary Examiner

R. D. EDMONDS, Assistant Examiner

U.S. Cl. X.R.

106—52